United States Patent [19]

Crean et al.

[11] Patent Number: 6,144,461
[45] Date of Patent: Nov. 7, 2000

[54] METHOD FOR GENERATING RENDERING TAGS TO FACILITATE THE PRINTING OF ANTIALIASED IMAGES

[75] Inventors: Peter A. Crean, Penfield; Robert P. Loce, Webster, both of N.Y.

[73] Assignee: Xerox Corporation, Stamford, Conn.

[21] Appl. No.: 09/046,232

[22] Filed: Mar. 23, 1998

[51] Int. Cl.⁷ .............................. B41B 15/00; B41J 15/00; G06F 15/00
[52] U.S. Cl. .............................. 358/1.9; 358/1.2; 358/1.3
[58] Field of Search .............................. 358/1.9, 1.1, 1.11, 358/1.17, 1.16, 298, 1.2, 1.18, 530, 533, 534, 535, 536, 538, 540; 345/136; 382/175, 176

[56] References Cited

U.S. PATENT DOCUMENTS

| | | | |
|---|---|---|---|
| 5,138,339 | 8/1992 | Curry et al. | 346/108 |
| 5,386,509 | 1/1995 | Suzuki et al. | 395/162 |
| 5,432,898 | 7/1995 | Curb et al. | 395/143 |
| 5,438,656 | 8/1995 | Valdes et al. | 395/143 |
| 5,485,289 | 1/1996 | Curry | 358/448 |
| 5,596,684 | 1/1997 | Ogletree et al. | 395/109 |
| 5,646,751 | 7/1997 | Motamed et al. | 358/518 |
| 5,673,376 | 9/1997 | Ray et al. | 345/427 |

OTHER PUBLICATIONS

"A Comparison of Antialiasing Techniques," IEE CG&A, vol. 1, No. 1, Jan. 1981, pp. 40–48, F. Crow.

*Primary Examiner*—Edward L. Coles
*Assistant Examiner*—Twyler Lamb

[57] ABSTRACT

The present invention is a method for antialiased tagging (AAT) applied coincident with an antialiasing operation. First, tagging methods for identifying antialiased pixels are described, the methods being employed separately or in concert with one another and focusing on pixels having a plurality of neighboring pixels that are near the extremes of the range of pixel levels (e.g. saturation and background). After tagging antialiased pixels, a preferred rendering method is optionally determined and is optionally included with the antialiased tagging information. Once tagged, said tag including the preferred rendering method, the pixel data and tag are then passed to a rendering processor and placed into a form suitable for binary printing.

18 Claims, 10 Drawing Sheets

METHOD FOR GENERATING RENDERING TAGS TO FACILITATE THE PRINTING OF ANTIALIASED IMAGES

CROSS REFERENCE

The following related applications are hereby incorporated by reference for their teachings:

"METHOD TO ENABLE THE RECOGNITION AND RENDERING OF ANTIALIASED IMAGES," R. Loce et al., application Ser. No. (09/046,414), filed concurrently herewith, "A METHOD OF ENCODING HIGH RESOLUTION EDGE POSITION INFORMATION IN CONTINUOUS TONE IMAGE INFORMATION," N. Zeck et al., U.S. Pat. No. (6,020,979), filed concurrently herewith, Ser. No. (09/046,231), "TEXT QUALITY ENHANCEMENT VIA RESOLUTION ENHANCEMENT TECHNIQUE BASED ON SEPARATING JAGGEDNESS DETECTION AND FILTERING," R. Eschbach, application Ser. No. 08/937,406, U.S. Pat. No. (5,956,470), filed Sep. 25, 1997.

"TAGGING OF ANTIALIASED IMAGES," R. Loce et al., application Ser. No. (09/046,424), filed concurrently herewith; and "MEMORY-EFFICIENT TAGGING OF ANTI-ALIASED IMAGES," S. Harrington et al., application Ser. No. (09/046,426), filed concurrently herewith.

This invention relates generally to a method, preferably operating in a raster image processor (RIP) to generate rendering tags to facilitate the printing of antialiased images, and more particularly to a method for generating antialiased rendering tags at the time pixels are being antialiased.

BACKGROUND AND SUMMARY OF THE INVENTION

Antialiasing in the context of digitizing line art and certain graphical image structures is best known as a method of using intermediate levels of intensity to achieve subpixel position of edges for several reasons including reduction or elimination of jaggies on the edges of lines and polygons, including text. Jaggies are primarily visible at the edges of sloped lines approaching horizontal or vertical. The term antialiasing suggests an analog term aliasing; normally representing the presence of low frequencies resulting from sampling high frequency signals at too low a sampling rate.

Figure 1:
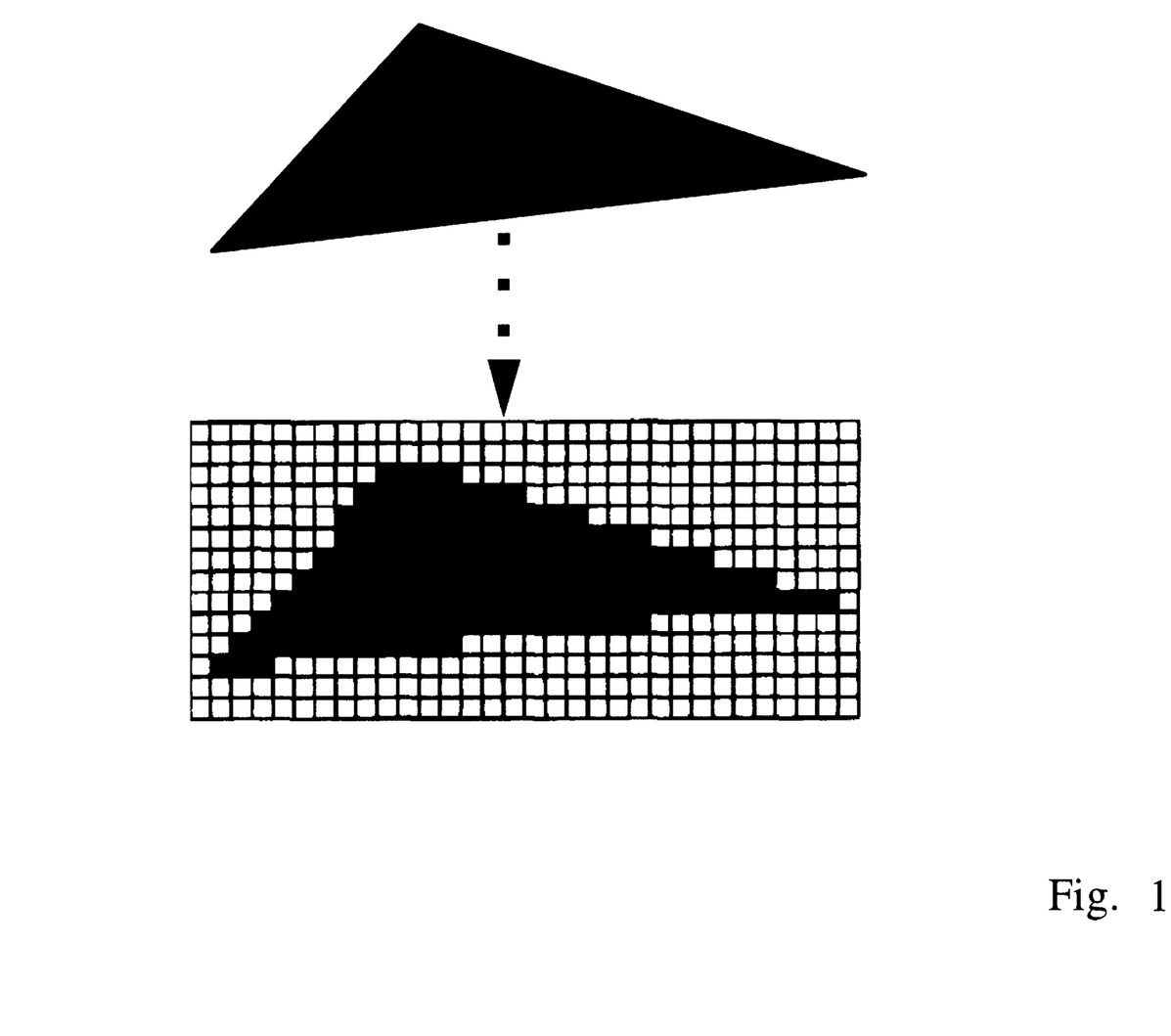
FIG. 1 is an illustration of a potential effect of aliasing in a digitized document image.

Consider a near-vertical (or near-horizontal) line segment. To be perfectly reproduced in a printed media, the phase, which represents the location of the edge, must continuously vary along the length of a segment. Due to the inherent sampling of a bi-level display or printed output, the phase exhibits jump discontinuities. Thus, this form of aliasing artifact leads to an induced jagged appearance where the structures are referred to jaggies. Within a sampled image any graphical object is eventually approximated as a polygon or collection of polygons. These polygons have straight edges, some of which will exhibit aliasing (jaggies and other placement defects). FIG. 1, for example, shows aliasing in two dimensions. When the triangle on the top of FIG. 1 is rasterized, the edges are aliased as reproduced in the triangle shown at the bottom of FIG. 1. In particular, the position along the bottom edge should move up slightly from column to column as one looks from left to right in the image at the bottom of FIG. 1. However, the position is quantized, as illustrated, producing the jagged appearance along the bottom of the triangle. Visibility of the anti-aliased image artifacts is increased by the regular nature of the jaggies, again a result of sampling.

Consider the following systems and their capability, or incapability, to utilize antialiased pixels. Xerox's Docucolor 40, for example, employs a high frequency analog line screen to render antialiased pixels, but that is not an option for some products or market segments. When conventional screens (e.g., approximately equal to 130–150 CPI dots) are employed in a rendering module, antialiased pixels are half toned and printed, resulting in objectionable halftone dots positioned along character edges. Hyperacuity printing techniques, for example those described by Curry, et al., (U.S. Pat. No. 5,138,339 and U.S. Pat. No. 5,485,289) can provide rendering for antialiased pixels that is compatible with simultaneously printing dot screen halftones in enhanced line art. However, these techniques require the use of tags to identify the antialiased pixels as antialiased line art. In the preferred embodiments described with respect to the present invention the rendering architecture distinguishes binary text/line from contone images to appropriately treat both image types. As will be described herein an algorithm or method may be employed in a rendering module or in other components of the rendering device to produce gray antialiased pixels of a form suitable for xerographic printing.

Antialiased images can be generated by capturing the image at a resolution greater than the final or desired output resolution, then reducing the resolution of the image by sub-sampling using an averaging process. A major benefit of antialiased images is that high contrast, saturated objects are surrounded with pixels possessing intermediate values that visually suggest the true, higher resolution position of object edges.

For example, in binary printing systems, such as many xerographic or ink jet systems that use a halftoning process to simulate continuous tone images, the antiliased edge pixels should be rendered with a very high frequency cell, ideally one having the resolution of the final output image. If the standard system halftone dot were to be used, the antialiased edges would be serrated or jagged at the standard halftone frequency. This rendering would reduce or even negate any value obtained through antialiasing. The use of a very high frequency screen over the entire antiliased image renders the antialiased pixel properly, but tends to sharpen the tonal curve and provoke print quality defects in the overall image. Also, distinct from the large area tonal reproduction curve (TRC), antialiasing may be employed so that the antiliased tonal reproduction curve meets any edge-pulling requirements specific to the output system (as opposed to a simple "averaging" process).

Hence, the present invention is directed to a method for tagging antialiased pixels that is applied within the architecture of a rendering device, and particularly, within a raster image processor (or digital front end) of such a system. Implementation of such a system in the early stages of processing, will enable the accurate and reliable identification of the antialiased pixels during later processing, as well as eliminate any need to subsequently attempt to characterize antialiased segments of the image with inherently less information about the image. Accurate identification of antialiased pixels enables the antialiased pixels to be rendered in a manner distinguishable from, and more appropriate than, the manner applied to continuous tone segments of an image.

Heretofore, a number of patents and publications have disclosed information related to antialiasing, the relevant portions of some may be briefly summarized as follows:

U.S. Pat. No. 5,646,751 to Motamed et al., issued Jul. 8, 1997, teaches a method for improving the speed of a color conversion operation using pixel tagging.

In "A Comparison of Antialiasing Techniques," IEEE CG&A, Vol. 1, No. 1, January 1981, pp. 40–48, F. Crow teaches that prefiltering is a computationally effective technique for antialiasing.

In accordance with the present invention, there is provided in a system for processing document images including both text/line art regions, and pictorial regions, a method for antialiasing segments of the image, including the steps of: receiving the document image; applying an anti-aliasing filter to text/line art regions within the image, to modify the image in a manner that suppresses aliasing effects; coincidentaly identifying those pixels modified by the antialiasing filter; and providing an indication for the identified pixels, said indication being detectable in a subsequent processing operation.

In accordance with another aspect of the present invention, there is provided, in a printing system, having a digital front end for processing document images including both text/line art regions, and pictorial regions, a method for antialiasing segments of the image, including the steps of: receiving the document image for printing on a medium; applying an antialiasing filter to text/line art regions within the image, to modify the image in a manner that suppresses aliasing effects present therein; coincidentaly identifying those pixels modified by the antialiasing filter; and providing an indication for the identified pixels, said indication being detectable in a subsequent processing operation.

One aspect of the invention deals with a basic problem in the rendering of antialiased images, particularly in text and line art regions—identifying the antialiased image segments on a pixel level. This aspect is further based on the recognition that the identification is preferably accomplished at the time of raster image processing; when the antialiasing occurs and may be indicated with a tag or similar indicia associated with a pixel or similar small image segment. The technique further employs a rendering architecture that, upon detecting indicia that a particular segment of an image has been antialiased, directs the rendering operation accordingly.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. An "image", a pattern of physical light, may include characters, words, and text as well as other features such as graphics. An image may be divided into "segments," each of which is itself an image. A segment of an image may be of any size up to and including the whole image.

Each location in an image may be called a "pixel." Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

An "image input device" is a device that can receive an image and provide an item of data defining a version of the image. A "scanner" is an image input device that receives an image by a scanning operation, such as by scanning a document.

An "image output device" is a device that can receive an item of data defining an image and provide or render the image as output. A "display" is an image output device that provides the output image in human viewable form.

Figure 2:
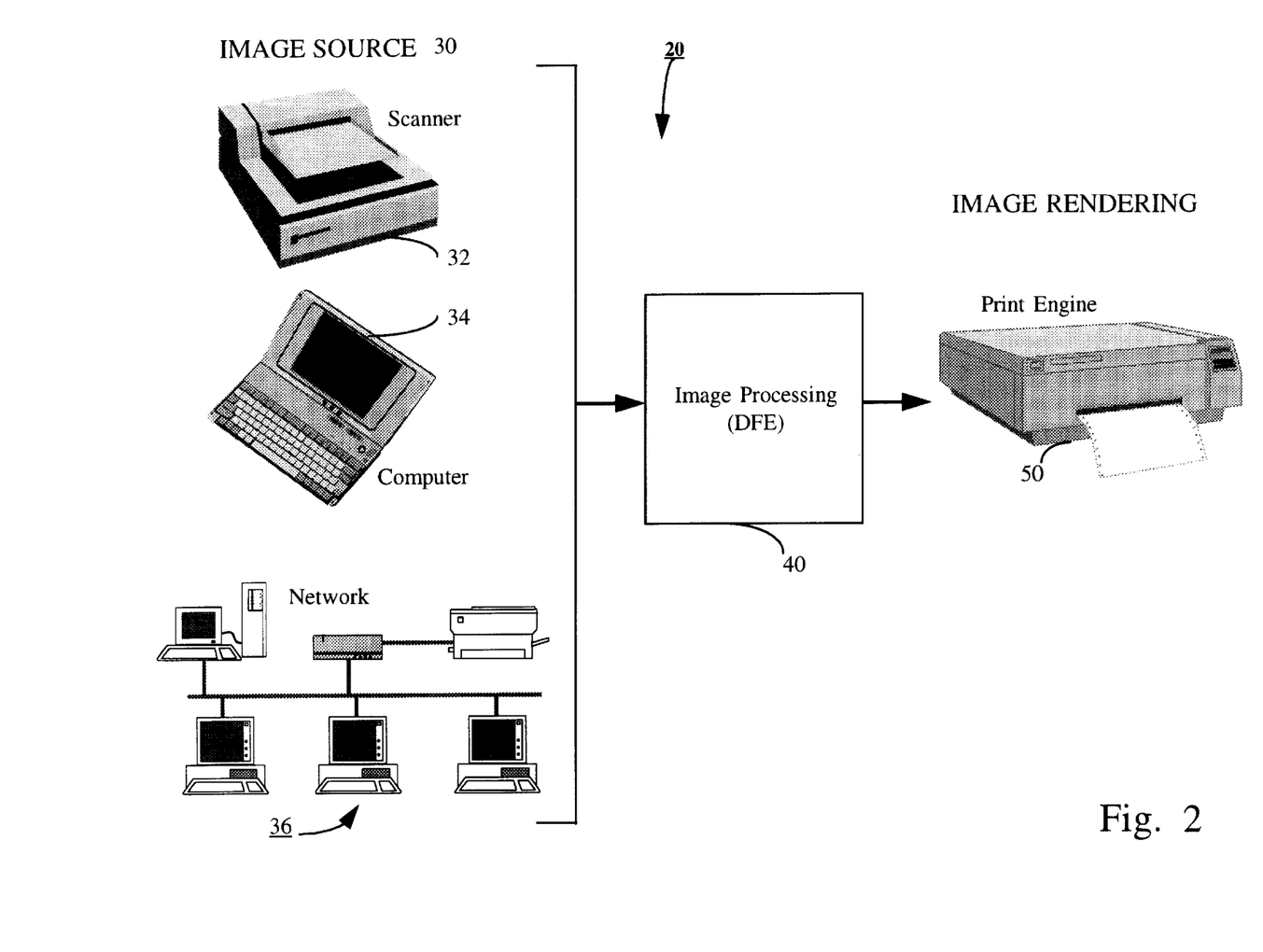
FIG. 2 is a general representation of a suitable system-level embodiment for one or more aspects of the present invention.

Turning now to FIG. 2, depicted therein is an embodiment of a preferred digital imaging system. In the system 20, image source 30 is used to generate image data that is supplied to an image processing system, also known in the art as a digital front end (DFE) 40, and which produces output data for rendering by print engine 50. It will be appreciated that the rendering of the image into a printable or displayable output format may be accomplished at any of a number of location, but is characterized herein as occurring in the print engine 50. For example image source 30 may include scanner 32, computer 34, network 36 or any similar or equivalent image input terminal. On the output end printer engine 50 is preferably a xerographic engine however engine 50 may include such equivalent alternatives as ink jet, etc. The present invention is directed toward aspects of image processor 40 depicted in FIG. 2. In particular, the intention of the present invention is to identify, and process accordingly, those pixels generated along antialiased regions of an image, wherein antialiasing treatments have been provided to reduce aliasing effects present within the image.

Figure 3:
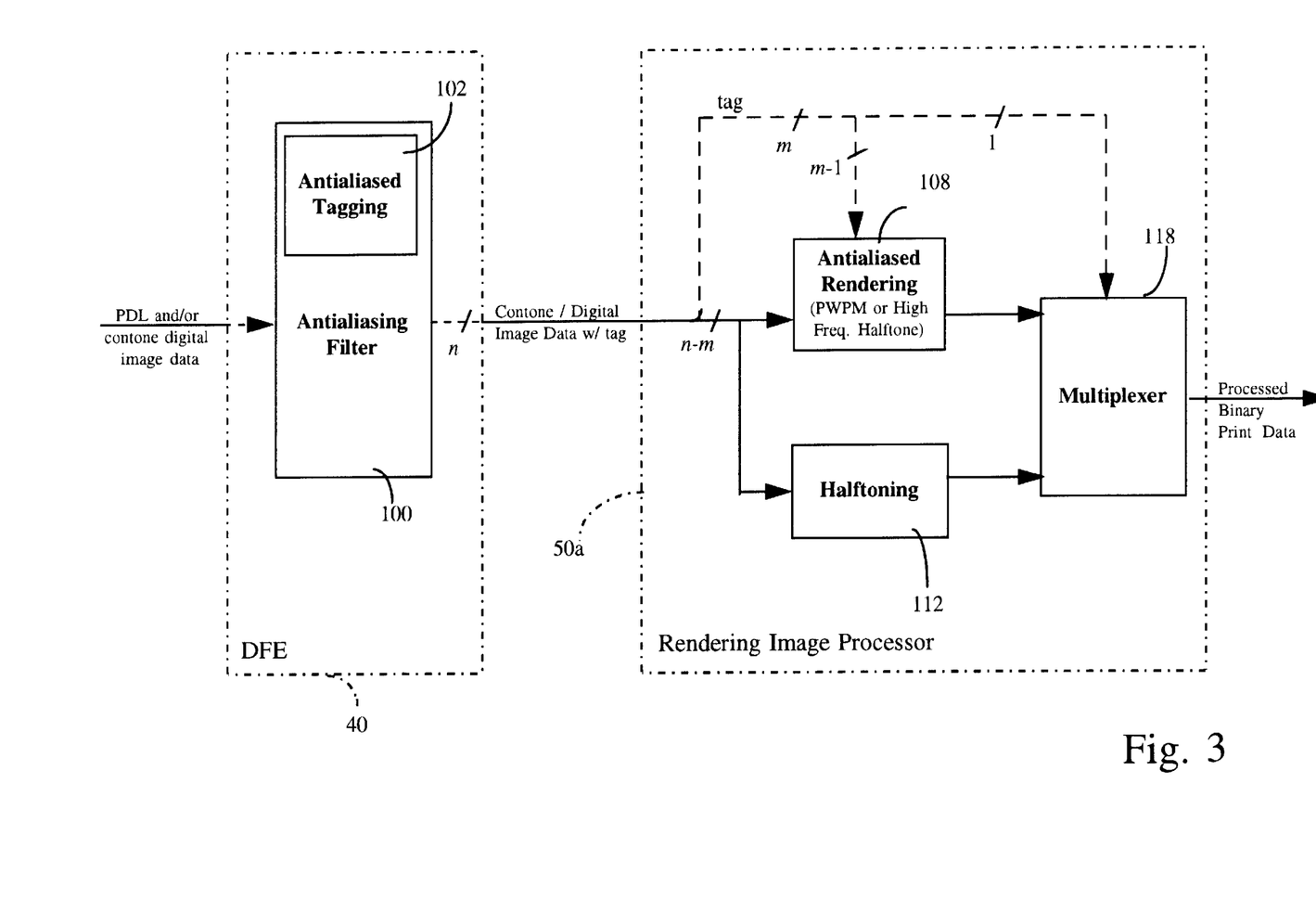
FIG. 3 is a generalized data flow representation of one embodiment of the present invention

Referring now to FIG. 3, shown therein is a detailed diagram depicting the data flow in an embodiment of the present invention. DFE system 40 receives raw (unprocessed) image data in one or more forms such as a page description language (PDL). In the course of processing the image, including other processes (not shown) that operate on the digital image data, DFE 40 preferably processes the PDL data so as to prepare the image for transfer to a rendering image processor and output on tangible media (e.g., print or display). Although other image processing operations may be conducted within the DFE, the present invention further includes those aspects directed to antialiasing of the image data as it is transformed into output data for subsequent printing or display. As represented by dashed line 42, the DFE may provide outputs in the form of tags independent from antialiased image information.

In FIG. 3 inputs to the DFE, such as a page description language file w/contone data, are illustrated along the left side of the figure. After receipt, the image data is processed in one of a number of well-known processes to decompose the PDL or other document information, and to process the document image in accordance with such information. As previously described, the image data preferably undergoes an antialias filtering operation at this point as well, to reduce or eliminate objectionable image artifacts caused by aliasing in the image sampling operation. For instance, the DFE may decompose the PDL into a high-resolution (e.g., 2400 spi resolution) image and then perform any necessary image processing on the high-resolution) image before reducing to a print resolution and transferring to the print engine and its associated rendering processor. The antialiasing may be performed in the process of reducing the resolution from a high resolution level to the output level, and the tag would be set based upon the content of the high resolution image.

Once decomposed in the DFE, and coincident with antialiasing, those pixels that are antialiased are preferably tagged as represented by antialiased tagging operation 102. In an alternative embodiment, the tag could be set based upon a difference between an image before and after (or with and without) antialiasing. After identification, specific antialiased pixels can be treated accordingly in the rendering image processor (50a) that is typically part of the print engine. It will be further appreciated that other tagging schemes are contemplated by the representation of the "other tags" input to rendering image processor 50. The other tags may, in some cases, even be generated by the DFE 40 and subsequently combined with the identification (tag) for antialiased pixels as represented by tag combination block 52. The contone data, with tags, is supplied to an antialiased rendering block 108, and a half-toning block 112. The tag output is supplied to antialias rendering block 108 to control processing therein, and is also used as a select signal in multiplexer 118. More importantly, the tag may be a multiple-bit tag as will be described herein, and various bits therein may be employed by the different sub-processes receiving the tag data. Alternatively, the tags may be an embedded "code" as characterized more specifically by Zeck et al. in copending application Ser. No. 09/046,231 , U.S. Pat. No. (6,020,979), previously incorporated by reference, so as to avoid the need for additional data transfer and storage. The output of antialias rendering block 108 and half toning block 112 are both supplied as inputs to multiplexer 118 and selection of one of the two inputs is used to produce the process binary print data that is output from multiplexer 118.

Figure 4:
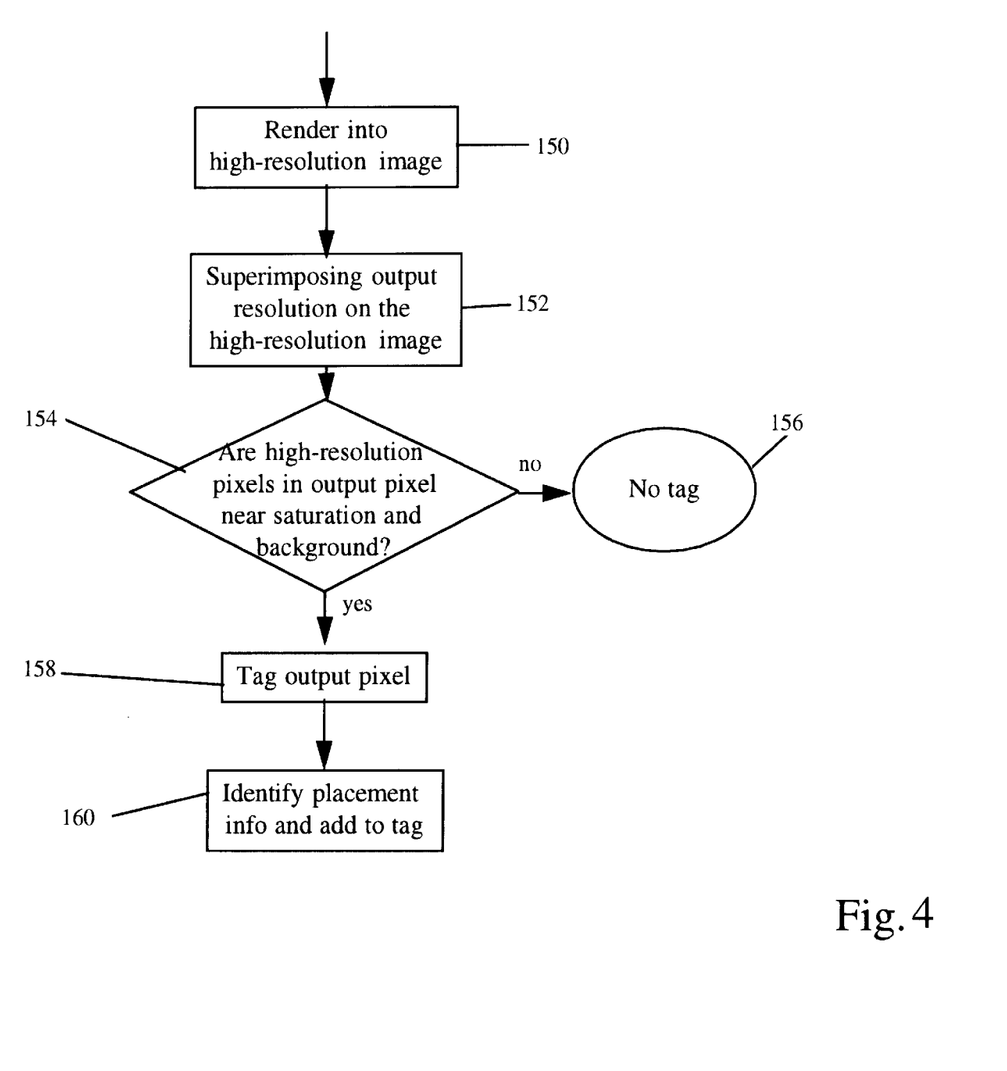
FIG. 4 is a flowchart illustrating the steps carried out in an antialias tagging operation as reflected in FIG. 3.
Figure 5:
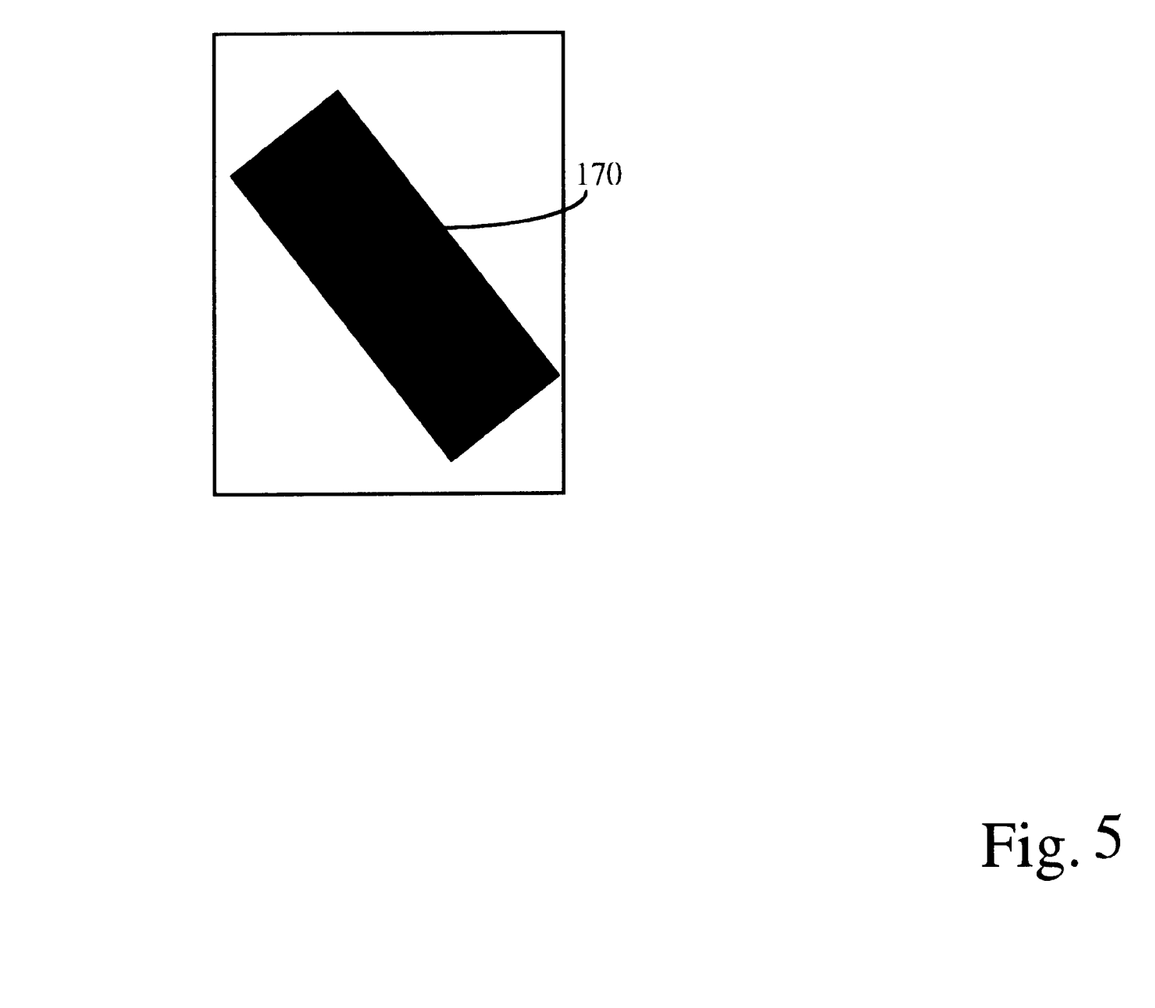
FIGS. 5–9 are illustrative examples of a high-resolution image processed in accordance with the steps outlined in FIG. 4.

Having briefly described the data flow of a preferred embodiment of the present invention attention is now turned to FIG. 4 which, in conjunction with FIGS. 5–9, further illustrates an embodiment of the antialiased tagging method in accordance with an aspect of the present invention. Generally, for DFE antialiasing methods that employ averaging of high-resolution pixels, a method of generating the rendering tag involves inspecting the high-resolution pixels that are averaged to make the print output pixel. Alternative methods that are also within the scope of the present invention contemplate a tagging operation based upon the fractional area coverage of a pixel before it is processed for rendering and, although more memory intensive, a comparison of an input image to an antialiased image to identify those pixels changed. Both of these alternatives may conceivably be employed in the image data stream coincident with the antialiasing operations.

In the situation where antialiasing is accomplished by averaging high-resolution pixels, when the range of the pixels averaged is limited to only gray levels near both saturation and background levels, then the pixel is preferably tagged for antialiased rendering as it was likely along an edge (i.e., having neighboring pixels near saturation and background). Moreover, pixels not so tagged will typically be rendered in accordance with an appropriate system halftone operation. It will be further appreciated that useful information related to the antialiased image pixels may be determined from the "parent" high-resolution image employed in producing the output resolution image. For example, in addition to aiding in the identification of antialiased pixels, the high-resolution image information may also be employed to indicate a specific antialiased rendering scheme (e.g., growth of a partial pixel dot from left to right).

Figure 6:
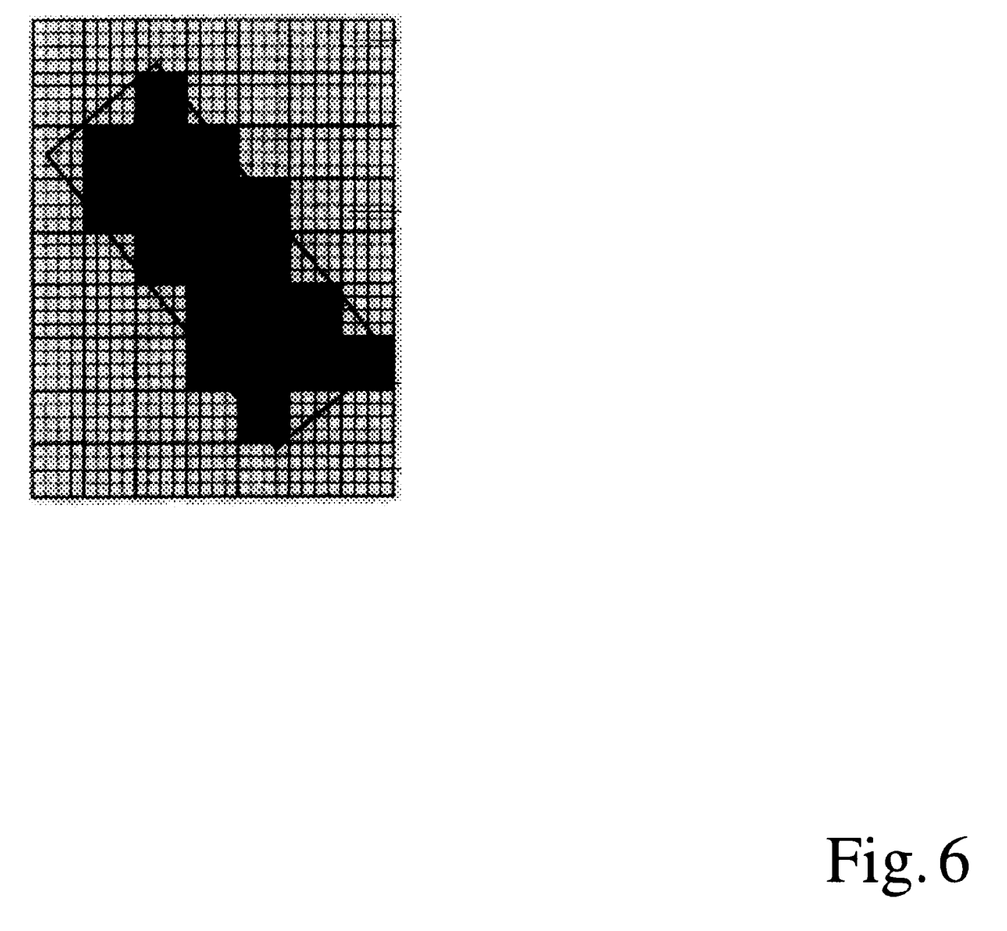
Figure 7:
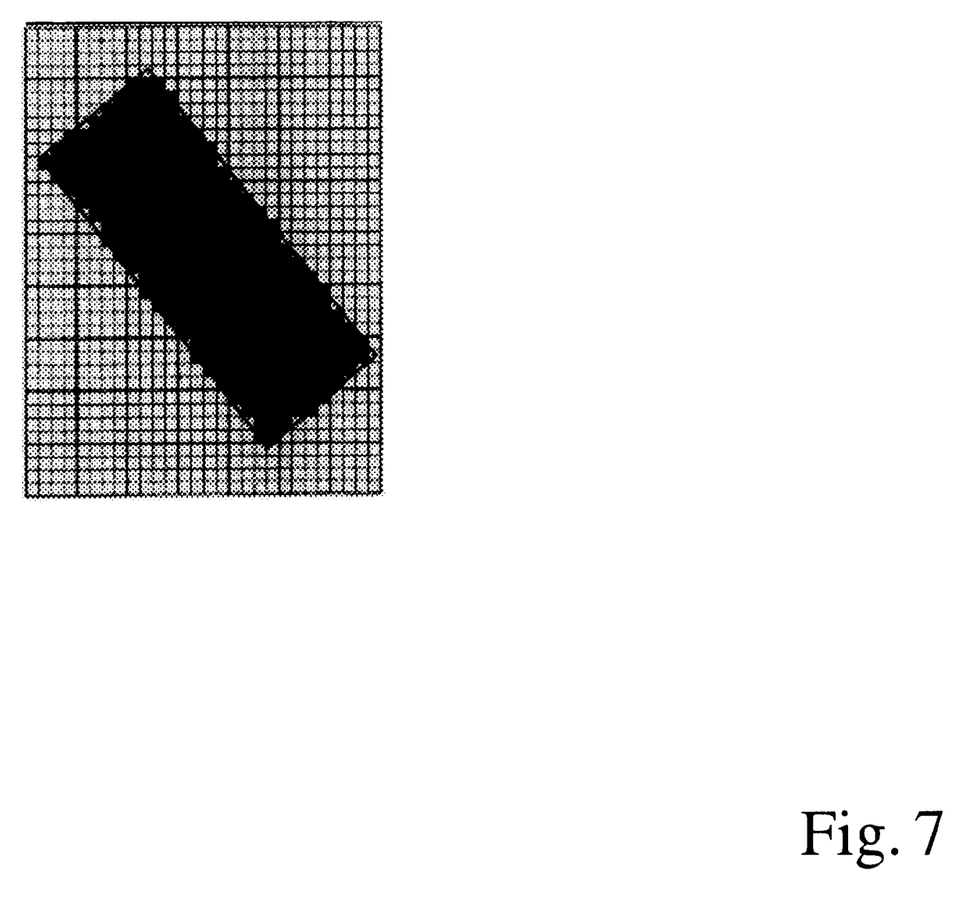
Figure 8:
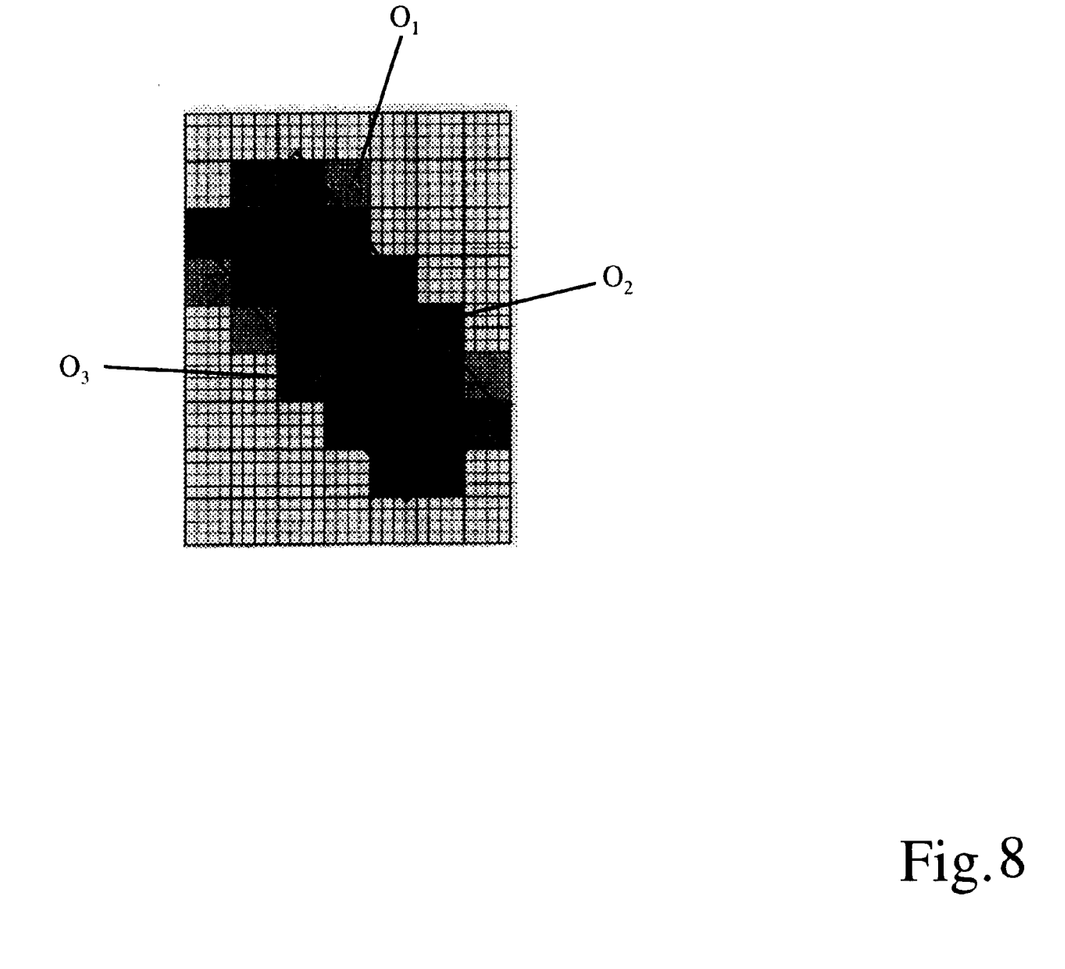
Figure 9:
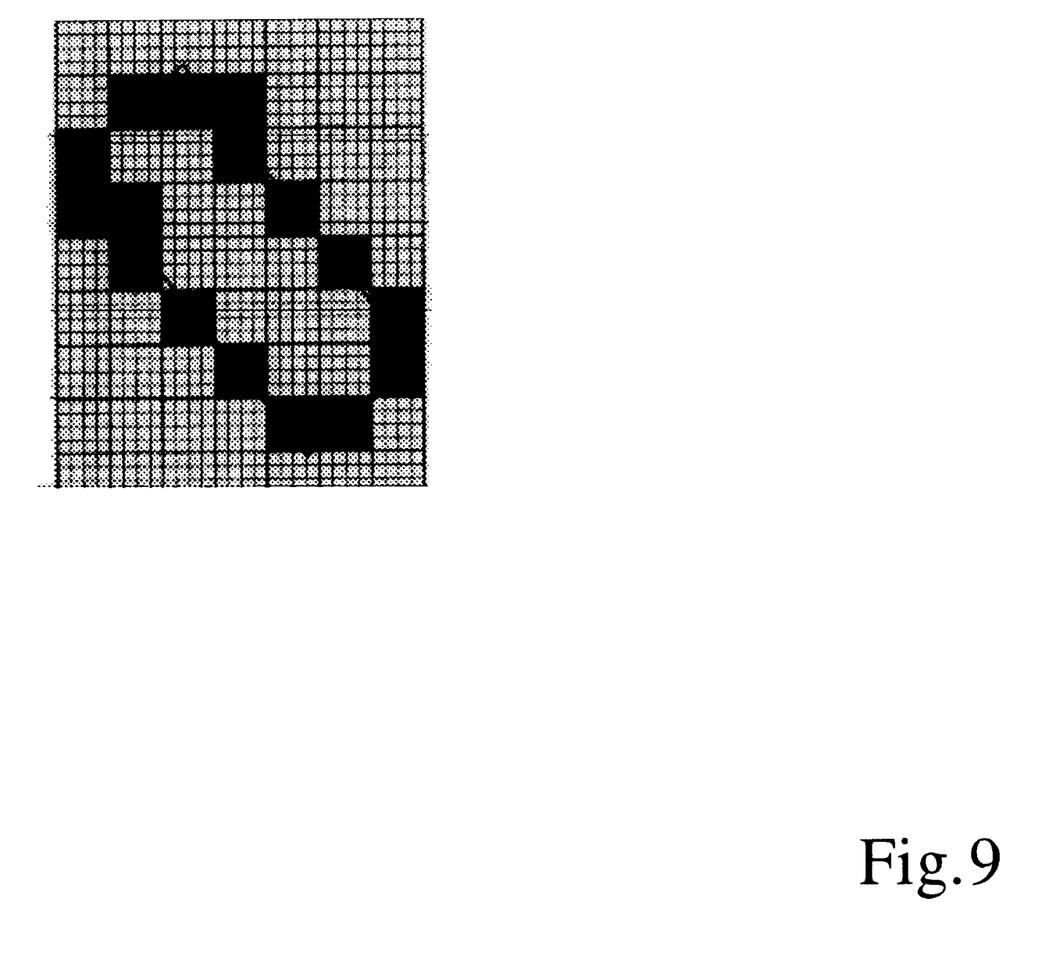

As represented by the tagging process depicted in FIG. 4, a high-resolution image is employed to identify antialiased pixels in the output resolution data. The results of various steps of processing stroke 170 in FIG. 5 will be referred to in order to further illustrate one of the tagging methods described herein. Specifically, the tagging process begins at step 150, where the DFE first renders the image into a high-resolution form. Next, the output resolution pixels are "superimposed" on the high-resolution image, step 152, so as to identify those high-resolution pixels associated with a particular output resolution pixel. FIG. 6 shows the outline of stroke 170 superimposed on the high-resolution pixel grid (where the lower output resolution grid is depicted as well by the thicker 4×4 grid lines). Step 154 tests, as described above, whether high-resolution pixels in a particular output pixel are all either near-saturation and near-background levels. FIG. 7 is an example of the high-resolution image, including those pixels that would be exposed to render stroke 170. For purposes herein, the actual ranges of near saturation and near background gray levels may be dependent upon the particular imaging system employed, but are typically between 1–5% (although possibly as high as 15%) of the minimum and maximum gray levels, respectively. A negative response to step 154 will result in no tag (or a non-antialiased tag step 156) whereas an affirmative response will cause a tag to be set in step 158. Examples of output resolution pixels tagged as antialiased pixels is depicted in FIG. 8, where pixels $O_1$, $O_2$ and $O_3$ are examples of those pixels that produced an affirmative response to step 154. In a similar fashion, FIG. 9 represents as darkened regions only those pixels tagged as antialiased for preferential rendering.

Although antialiased tagging is completed at step 158, in a preferred embodiment, the high-resolution pixel information may be employed, as indicated by step 160, to further characterize appropriate rendering operations for the antialiased pixels in certain situations. In particular, neighboring image structure information may be used to cause the pixel to be rendered as a dot growing from the left edge, from the center (default), from the right edge, or as a split dot; in cases where it is clear that rendering should be directed toward a preferred side that can be accomplished, otherwise rendering will be isotropic. Accordingly, the tag employed may be a multi-bit tag providing the additional information. Details of the information, and methods for characterizing a preferred dot growth direction are further described in copending U.S. patent application Ser. No. (09/046,424) by Loce et al.

Determining and applying the fill order of an antialiased pixel is conceptually distinct from antialiased-pixel identification, although the concepts may be combined into one operation. In a preferred embodiment, each tagged pixel will be rendered (halftoned) with an appropriate dot or cell. Pixels not recognized as antialiased pixels will be halftoned using a system dot, while higher-resolution dots (e.g., 200–2400 spi depending upon the output device, although preferably in the range of 600 spi) will be used for the antialiased pixels.

Figure 10:
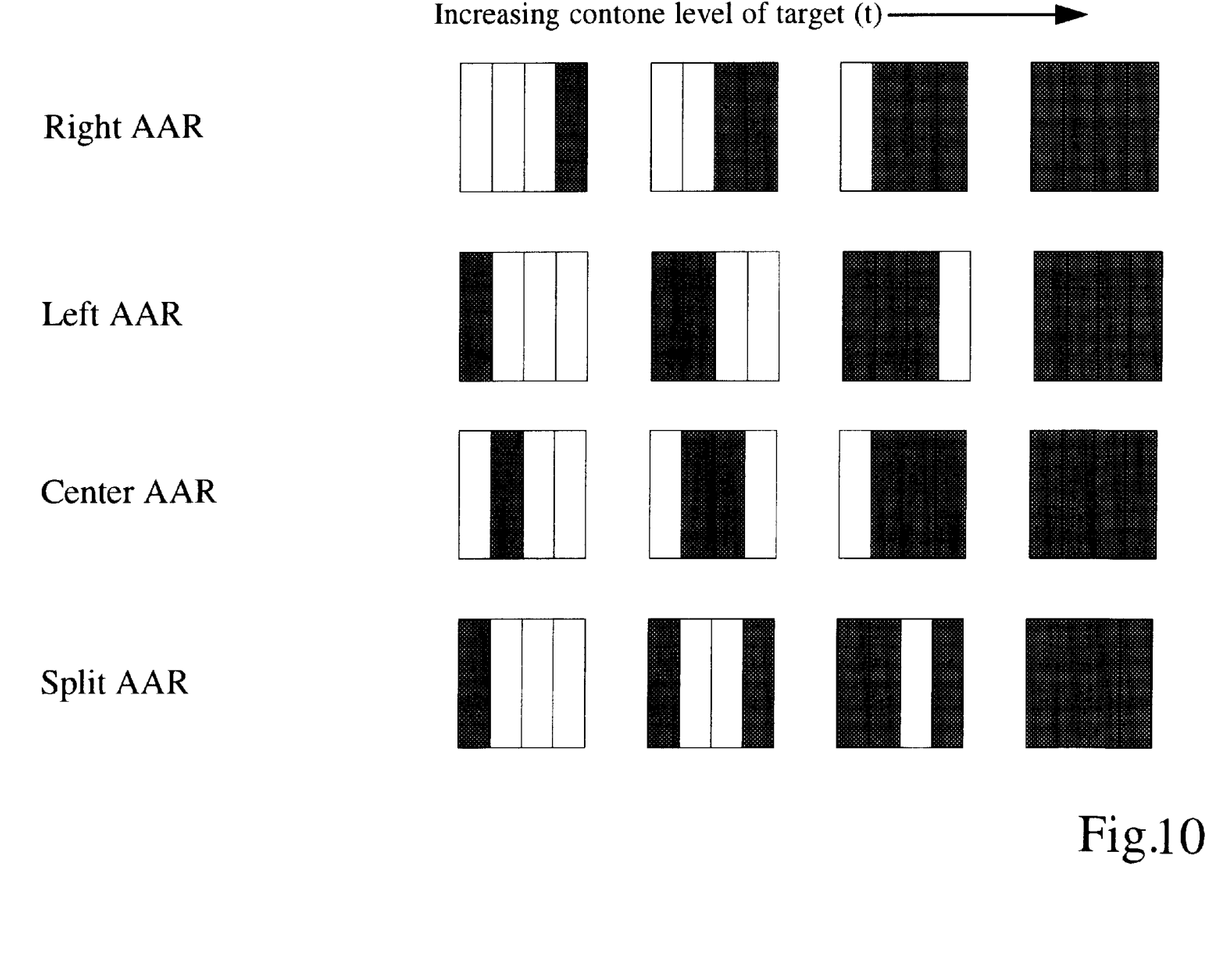
FIG. 10 is a representation of several possible dot growth options that would be employed to control the rendering operation in accordance with an aspect of the present invention.

Five pixel rendering methods (four AAR methods and one system halftone dot) for a particular output pixel are represented below:

Left Fill for AAR: (AAR)(L)
Right Fill for AAR: (AAR)(R)
Split Fill for AAR: (AAR)(S)
Center Fill for AAR:(AAR)(C) and
System Halftone: $(AAR)^c$ In the above notation AAR is a logical tag possessing values 1 or 0 for antialiased or not, and L, R, S, and C are logical tags respectfully possessing values 1 or 0 for left growth or not left growth, right growth or not right growth, split growth or not split growth, and center growth or not center growth. Thus, a 3-bit tag could be employed to represent whether the pixel was antialiased as well as to indicate a preferred dot rendering method. If the tag must be limited to only two bits of information, it is possible to eliminate use of either the split fill or center fill. If the tag is limited to but a single bit, it is preferred to limit the rendering options to the system halftone dot and the center fill or split fill AAR halftone. FIG. 10 is an illustration of possible imaging dots that may be created in one rendering embodiment (e.g., 4× high-addressable, fast scan resolution) of the present invention. As illustrated, for example in the left fill (AAR(L)) situation, the pixel position is filled from the left using progressively (depending upon the contone level of the target pixel) wider exposure pulses until a pixel or image dot is completely filled. It will be further appreciated that alternative filling orders and/or higher pixel pulse resolution may be used as well.

In recapitulation, the present invention is a method for antialiased tagging (AAT) applied coincident with an anti-aliasing operation. First, tagging methods for identifying antialiased pixels were described, the methods being employed separately or in concert with one another. After tagging antialiased pixels, a preferred rendering method is optionally determined. Once tagged, said tag including the preferred rendering method, the pixel data and tag are then passed to a rendering processor and placed into a form suitable for binary printing.

It is, therefore, apparent that there has been provided, in accordance with the present invention, a method for tagging antialiased pixels within an image coincident with antialiasing the pixels. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. In a system for processing document images including both text/line art regions, and pictorial regions, a method for antialiasing segments of the image, including the steps of:

receiving the document image;

applying an anti-aliasing filter to text/line art regions within the image, to modify the image in a manner that suppresses aliasing effects;

coincidentally identifying those pixels modified by the antialiasing filter; and providing a digital tag including at least a single bit of information for the identified pixels, said digital tag being detectable in a subsequent processing operation.

2. The method of claim 1, further including the step of suggesting, as a function of pixels neighboring the identified pixels, a rendering technique so as to appropriately render the identified pixels, wherein the digital tag includes at least one additional bit of information representing a suggested rendering technique.

3. The method of claim 2, further including the step of applying an appropriate rendering technique for each antialiased pixel as a function of the tag.

4. The method of claim 1, wherein the step of applying an antialiasing filter to text/line art regions within the image includes rendering the image as a high-resolution image, at a resolution greater than an output resolution, and where the step of coincidently identifying those pixels modified by the antialiasing filter, comprises the steps of:

superimposing an output resolution structure on the high-resolution image to identify those high-resolution pixels associated with a particular output resolution pixel;

determining whether the high-resolution pixels associated with a particular output pixel are all near an extreme of the range of possible pixel levels; and if so, identifying the pixel as an antialiased pixel.

5. The method of claim 4, wherein the extreme of the range of possible pixel levels is that portion of the range within about 15 percent of an extreme point.

6. The method of claim 5, wherein the extreme point is a maximum.

7. The method of claim 5, wherein the extreme point is a minimum.

8. The method of claim 1, wherein the step of coincidently identifying those pixels modified by the antialiasing filter, comprises the steps of tagging an output pixel as antialiased as a function of the fractional area coverage of the pixel before being processed for rendering.

9. In a printing system, having a digital front end for processing document images including both text/line art regions, and pictorial regions, a method for antialiasing segments of the image, including the steps of:

receiving the document image for printing on a medium;

applying an antialiasing filter to text/line art regions within the image, to modify the image in a manner that suppresses aliasing effects present therein;

coincidentally identifying those pixels modified by the antialiasing filter; and providing a digital tag including at least a single bit of information for the identified pixels, said digital tag being detectable in a subsequent processing operation.

10. The method of claim 9, further including the step of suggesting, as a function of pixels neighboring the identified pixels, a rendering technique so as to appropriately render the identified pixels, wherein the digital tag includes at least one additional bit of information representing a suggested rendering technique.

11. The method of claim 10, further including the step of applying an appropriate rendering technique for each antialiased pixel as a function of the tag.

12. The method of claim 9, wherein the step of applying an antialiasing filter to text/line art regions within the image includes rendering the image as a high-resolution image, at a resolution greater than an output resolution, and where the step of coincidently identifying those pixels modified by the antialiasing filter, comprises the steps of:

- superimposing an output resolution structure on the high-resolution image to identify those high-resolution pixels associated with a particular output resolution pixel;
- determining whether the high-resolution pixels associated with a particular output pixel are all near an extreme of the range of possible pixel levels; and
- if so, identifying the pixel as an antialiased pixel.

13. The method of claim 12, wherein the extreme of the range of possible pixel levels is that portion of the range within about 15 percent of an extreme point.

14. The method of claim 13, wherein the extreme point is a maximum.

15. The method of claim 13, wherein the extreme point is a minimum.

16. The method of claim 9, wherein the step of coincidently identifying those pixels modified by the antialiasing filter, comprises the steps of tagging an output pixel as antialiased as a function of the fractional area coverage of the pixel before being processed for rendering.

17. A system for processing digital document images including both text/line art regions, and pictorial regions, including:

- an image source for supplying the digital document image;
- an anti-aliasing filter to the text/line art regions within the digital document image and modify the image in a manner that suppresses aliasing effects;
- an antialiased pixel tagger for coincidently identifying those pixels modified by the antialiasing filter, said antialiased pixel tagger outputting an indication for the identified pixels, wherein said indication is detectable in a subsequent processing operation.

18. The system of claim 17, further including a rendering processor, responsive to the indication, for processing the pixel and the indication to produce a rendered image suitable for output.

* * * * *